Figure 1:
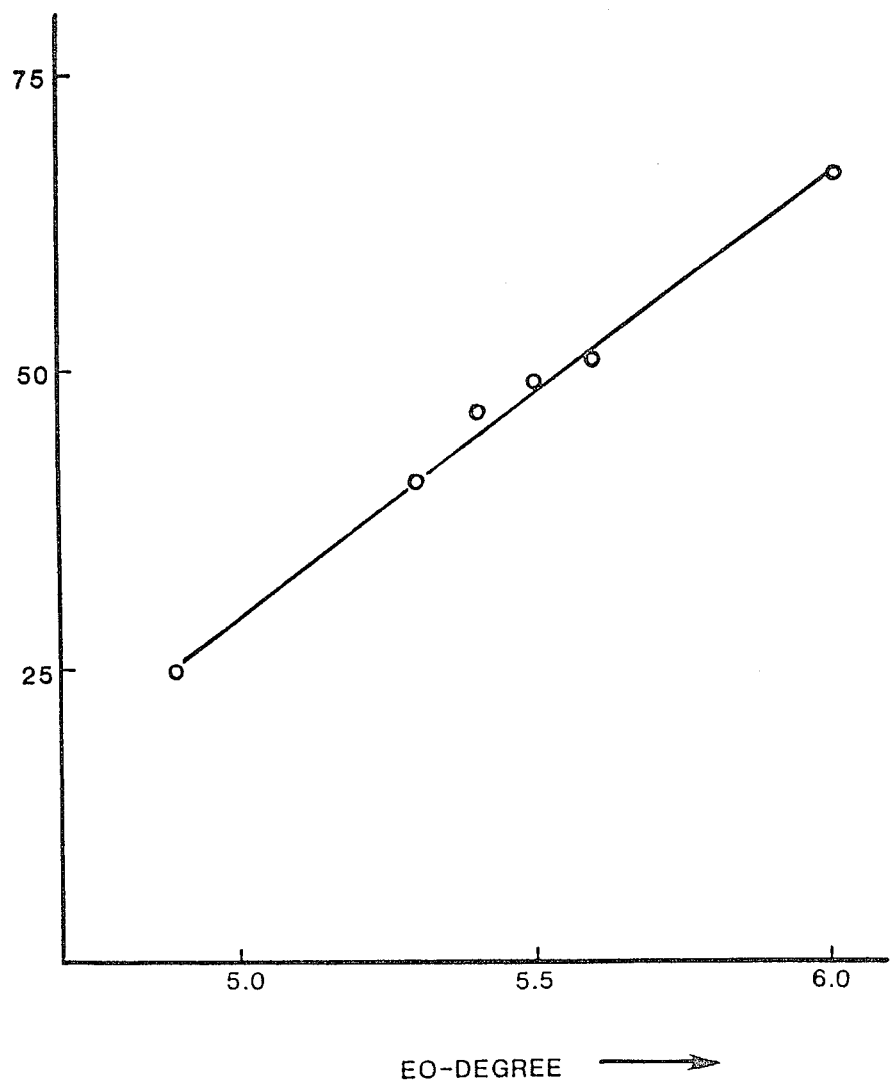

United States Patent [19]

Balzer et al.

[11] Patent Number: 4,485,873
[45] Date of Patent: * Dec. 4, 1984

[54] PROCESS FOR OIL RECOVERY FROM A SUBTERRANEAN RESERVOIR

[75] Inventors: Dieter Balzer; Kurt Kosswig, both of Marl, Fed. Rep. of Germany

[73] Assignee: Chemische Werke Huels, A.G., Marl, Fed. Rep. of Germany

[ * ] Notice: The portion of the term of this patent subsequent to Jul. 3, 2001 has been disclaimed.

[21] Appl. No.: 413,908

[22] Filed: Sep. 1, 1982

Related U.S. Application Data

[63] Continuation-in-part of Ser. No. 300,427, Sep. 9, 1981.

[30] Foreign Application Priority Data

Sep. 1, 1981 [DE] Fed. Rep. of Germany ....... 3134530

[51] Int. Cl.³ .............................................. E21B 43/22
[52] U.S. Cl. ..................... 166/274; 166/273; 252/8.55 D
[58] Field of Search ................. 252/8.55 D; 166/274, 166/275

[56] References Cited

U.S. PATENT DOCUMENTS

| | | | |
|---|---|---|---|
| 2,233,381 | 2/1941 | De Groote et al. ................ | 252/8.55 |
| 4,110,228 | 8/1978 | Tyler et al. ......................... | 252/8.55 |
| 4,265,308 | 5/1981 | Hedges et al. .................. | 252/8.55 X |
| 4,293,428 | 10/1981 | Gale et al. ............................ | 252/8.55 |

OTHER PUBLICATIONS

Lepper, "Erdoel Ergas Zeitschrift", 92:426, (1976).
Balzer et al, Tenside Detergents 16:256, (1979).

*Primary Examiner*—Herbert B. Guynn
*Attorney, Agent, or Firm*—Millen & White

[57] ABSTRACT

A process for the recovery of extensively emulsion-free oil from a subterranean reservoir of medium or high salinity comprises forcing into an injection well a 0.1-20% (e.g., 1-20%) by weight solution or dispersion in formation water of carboxymethylated ethoxylates of the formula

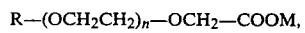

$$R-(OCH_2CH_2)_n-OCH_2-COOM,$$

wherein
  R is a linear or branched aliphatic residue of 4–20 carbon atoms or an alkylaromatic or dialkylaromatic residue of 1–14 carbon atoms in the alkyl group,
  n is 1–30, e.g., 3–30, and
  M is an alkali or alkaline earth metal ion or ammonium,
  and the degree of carboxymethylation is between 10 and 100%, wherein the carboxymethylated oxethylate is selected so that the phase inversion temperature of the system: crude oil/formation water/tenside/optional additives, is 0°–10° C. above the reservoir temperature.

12 Claims, 2 Drawing Figures

PROCESS FOR OIL RECOVERY FROM A SUBTERRANEAN RESERVOIR

CROSS REFERENCE TO RELATED APPLICATION

This is a continuation in part of U.S. application Ser. No. 300,427 of Sept. 9, 1981.

This application is related to U.S. application Ser. Nos. 300,427 of Sept. 9, 1981, 300,547 of Sept. 9, 1981, 349,947 of Feb. 18, 1982 and 349,945 of Feb. 18, 1982, all of whose disclosures are incorporated by reference herein.

BACKGROUND OF THE INVENTION

The present invention concerns a process for oil recovery by tenside flooding.

In the extraction of oil from oil-bearing deposits, it is generally possible only to recover a fraction of the oil originally present by means of primary extraction methods. In these procedures, the oil reaches the surface due to the natural reservoir pressure. In secondary oil recovery, water is forced into one or several injection wells of the formation, and the oil is driven to one or several production wells and thereafter brought to the surface. This so-called water flooding as a secondary measure is relatively inexpensive; accordingly, it is frequently employed, but leads in many cases to only a minor increase in oil extraction from the deposit.

A more effective displacement of the oil can be accomplished by tertiary measures. These are more expensive but still urgently necessary from the viewpoint of national economies because of the present scarcity of petroleum. Such processes are those wherein either the viscosity of the oil is reduced and/or the viscosity of the flooding water is increased and/or the interfacial tension between water and oil is lowered. Most of these processes can be classified as solution or mixture flooding, thermal oil recovery methods, tenside or polymer flooding and/or as combinations of several of the aforementioned methods.

Thermal recovery methods include the injection of steam or hot water and/or take place via in situ combustion. Solution or mixture processes inject a solvent for the petroleum into the deposit. The solvent can be a gas and/or a liquid.

Tenside flooding processes are based primarily on a strong lowering of interfacial tension between oil and flooding water. Depending on the tenside concentration and in some cases on the type of tenside and additives, these are termed tenside-supported water flooding, customary tenside flooding (low-tension flooding), micellar flooding, and emulsion flooding. However, in some instances, especially in the presence of relatively high tenside concentrations, water-in-oil dispersions are produced. As compared with the oil, these have a markedly increased viscosity. In such cases, the tenside flooding step also aims to reduce the mobility ratio whereby the degree of efficiency of oil displacement is raised. Pure polymer flooding is based predominantly on the last-described effect of a more favorable mobility ratio between the oil and the pursuing flooding water.

Heretofore, organic sulfonates, such as alkyl, alkylaryl, or petroleum sulfonates, have been primarily disclosed as oil-mobilizing tensides. However, these materials possess a very low tolerance limit with respect to the salinity of the deposit waters. Salt concentrations of as low as 1,000 ppm are considered problematic, the sensitivity of these tensides to alkaline earth metal ions being especially pronounced. For these, the upper critical limit concentration is assumed to be about 500 ppm (U.S. Pat. No. 4,110,228). When using these tensides, precipitation products are formed in the presence of higher salt concentrations. These are apt to clog the formation. However, since many deposit waters possess substantially higher salinities, for example in Northern Germany up to 250,000 ppm, methods have been sought for exploiting the otherwise good oil-mobilizing properties of the organic sulfonates for higher-salinity formation systems as well. In admixture with co-surfactants, such as alcohols or nonionic tensides, organic sulfonates do show lower electrolyte sensitivity, but in most cases the oil-mobilizing activity was likewise reduced.

In contrast to this class of compounds, alkyl or alkylaryl polyglycol ether sulfates or carboxymethylated alkyl or alkylaryl ethoxylates show good compatibility even at extremely high salinities (for example, 250,000 ppm) of the formation waters. Since the oil-mobilizing effect of these tensides is good (H. J. Neumann, "DGMK BERICHTE" [DGMK Reports], Report 164 [1978]; D. Balzer and K. Kosswig, Tenside Detergents 16: 256 [1979] whose disclosures are incorporated by reference herein) and their manufacture is simple and economical, these classes of compounds are very well suited for use in oil displacement in medium- and high-salinity deposit systems (10,000–250,000 ppm total salt content).

In numerous investigations on the nature of residual oil mobilization in model formations using carboxymethylated ethoxylates as the tensides, it has been observed, however, that the transport of the oil bank through the formation is accompanied by a strong pressure rise. Thus, even in the case of relatively highly permeable artificial formations, pressure gradients were observed of up to about 40 bar/m. When transposed into field conditions, these lead to pressures far above the petrostatic pressure. This effect is apt to exclude the use of these tensides in tertiary petroleum recovery.

The literature likewise discloses pressure gradients of a similar magnitude (C. Marx, H. Murtada, M. Burkowsky, "Erdoel Erdgas Zeitschrift" [Petroleum-Natural Gas News] 93: 303 [1977]). These authors explain the high pressure differences by the formation of emulsion zones which, however, are said to be limited to the region of the flooding front. In in-house experiments, however, a local limitation of the pressure gradient could not be observed. Inasmuch as crude oil emulsions, stabilized by carboxymethylated ethoxylates, are structurally viscous, the high pressure differences also cannot be arbitrarily lowered by reducing the flooding velocity. Consequently, one would have to expect uncontrollably high pressure gradients in tenside flooding with carboxymethylated ethoxylates in a field test.

Therefore, attempts have been made to find a tenside flooding method based on the highly oil-mobilizing carboxymethylated ethoxylates but which does not produce high pressure gradients. Lowering of the pressure gradient is possible by achieving a greatly delayed tenside breakthrough by suitable adaptation of the amount of tenside to the deposit. However, this mode of operation presupposes homogeneous formations. Although these might occur in artificial sand piles, they hardly occur in actual deposits. Therefore, a solution to this problem is really not possible in this way.

SUMMARY OF THE INVENTION

Accordingly, it is an object of the invention to provide a new process for recovery of oil from subterranean deposits using tenside flooding methods which eliminates or ameliorates the foregoing disadvantages.

Upon further study of the specification and appended claims, further objects and advantages of this invention will become apparent to those skilled in the art.

These objects have been achieved by providing a process for the recovery of extensively emulsion-free oil from a subterranean reservoir of medium or high salinity comprising forcing into an injection well a 0.1–20% (e.g., 1–20%) by weight solution or dispersion in formation water of carboxymethylated ethoxylates of the formula $$R-(OCH_2CH_2)_n-OCH_2-COOM,$$

wherein

R is a linear or branched aliphatic residue of 4–20 carbon atoms or an alkylaromatic or dialkylaromatic residue of 1–14 carbon atoms in the alkyl group, n is 1–30, e.g., 3–30, and M is an alkali or alkaline earth metal ion or ammonium, and the degree of carboxymethylation is between 10 and 90%, optionally 10–100% wherein the carboxymethylated oxethylate tenside is selected so that the phase inversion temperature of the system: crude oil/formation water/tenside/optional additives, is 0°–10° C., preferably, 1°–5° C. above the reservoir temperature.

DETAILED DISCUSSION

The solution of this invention has been surprisingly achieved by abandoning a working hypothesis, also confirmed by the literature, according to which effective residual oil extraction is only feasible if there exist during the entire flooding process conditions for the presence of a water-in-oil emulsion if at all possible (U. Lepper, "Erdoel Erdgas Zeitschrift" 92: 426 [1976]). According to D. Balzer and K. Kosswig, Tenside Detergents 16: 256 (1979) which is incorporated by reference herein, this means that the phase inversion temperature (PIT) of the system: original crude oil and original formation water as well as tenside and optional additives, must lie markedly below the deposit temperature, namely up to 15° C. below it. In flooding tests made under these conditions in model formations, very effective oil extractions were ordinarily observed, wherein the crude oil could be flooded out quite predominantly free of emulsion. However, in this mode of operation high pressure gradients occur with great frequency.

It has now been discovered that the pressure gradient can be lowered by 20 to 100 times, with good oil extraction, by means of the process of this invention. This was extremely surprising inasmuch as its required temperature range is the phase range of an oil-in-water emulsion. Furthermore, if a tenside is selected which, with respect to the deposit system, has a PIT which is 11° C. or more above the deposit temperature, thus being in the phase range of the oil-in-water emulsion, mobilization of the residual oil is poorly effective, and the oil is conveyed quite predominantly as an emulsion.

The PIT proper is conventionally determined by measuring the electric conductivity. For this purpose, an emulsion, consisting of the crude oil and the formation water of the respective deposit (phase ratio 1:1) and the tenside (2–5%, based on the aqueous phase), as well as optional additives, is prepared, and its electric conductivity is measured in dependence on the temperature. At the PIT, an oil-in-water emulsion changes over into a water-in-oil emulsion, or vice versa, the electric conductivity dropping or rising jump-like at this point. Precisely speaking, this is a temperature range of a few degrees Celsius. The temperature at which the electric conductivity has reached the mean value between the upper (o/w) and the lower (w/o) level is recorded as the PIT. Relating these test values to actual conditions is a fully conventional step.

The present invention relates to the use of carboxymethylated oxethylates as oil-mobilizing tensides. These compounds can be prepared according to German Pat. No. 2,418,444 whose disclosures as incorporated by reference herein by reacting oxethylates of the formula $R-(O-CH_2-CH_2)_nOH$ with a salt of chloroacetic acid in the presence of an alkali metal hydroxide or an alkaline earth metal hydroxide. However, other conventional manufacturing processes are likewise suitable.

For this invention, R is a saturated or unsaturated straight-chain or branched aliphatic group, e.g., an alkyl residue of 4–20, preferably 8–16 carbon atoms, or an alkylaryl residue of 1–14 carbon atoms in the alkyl residue, such as alkylphenyl or dialkylphenyl. The aryl residue generally has 6–10 C-atoms.

The symbol n can have values of 1–30, preferably 1–20. Suitable cations include sodium, potassium, lithium, ammonium, calcium, or magnesium.

Suitable alcohols and phenols, the oxyethylates of which form the basis for the carboxymethylates include, for example: hexyl alcohol, octyl alcohol, nonyl alcohol, decyl alcohol, undecyl, lauryl, tridecyl, myristyl, palmityl, and stearyl alcohols, but also unsaturated alcohols, such as, for example, oleyl alcohol and the like. The alkyl chain can be normal or branched. It is especially advantageous to employ commercially available mixtures of these alcohols. Suitable alkyl phenols are, for example: ethylphenol, propylphenol, butylphenol, hexylphenol, octylphenol, nonylphenol, decylphenol, undecylphenol, dodecylphenol, tridecylphenol, tetradecylphenol, dibutylphenol, dihexylphenol. The alkyl chain can be normal or branched. Commercial mixtures of these alkyl phenols can be especially readily employed.

The oxethylation can be conventionally effected in the presence of catalytic amounts of alkali metal hydroxide with 1–30, preferably 1–20 moles of ethylene oxide per mole of alcohol. The resultant mixtures have approximately a Poisson distribution.

In correspondence with their manufacturing method, the carboxymethylated ethoxylates always contain considerable amounts of unreacted oxethylate. Therefore, the formula $R-(OCH_2-CH_2)_n-OCH_2-COOM$ in all cases refers to a mixture of varying quantities of unreacted and reacted oxethylate. Consequently, a carboxymethylation degree can be defined. It has been found that mixtures having a carboxymethylation degree of 10 to 90%, preferably 30 to 90%, are capable of effectively displacing the oil. Especially effective are mixtures having degrees of carboxymethylation of 50–90%. Percent here means percent by weight in all cases. Mixtures having degrees of carboxymethylation of 10–100, especially 50–100, are effective too.

The aforedescribed mixtures of anionic and nonionic tensides, called carboxymethylated ethoxylates, are soluble or at least readily dispersible in ordinary deposit waters, and no precipitations whatsoever are observed.

The process of this invention can be carried out as follows. With a knowledge of the deposit temperature or, if applicable, a temperature range, the PIT is measured for orientation purposes from the crude oil, the formation water, and, optionally, the gas of the deposit, and a carboxymethylated ethoxylate of the abovementioned formula which appears suitable. This measurement can be repeated, if necessary, with additional tensides of this class and optional additives.

The final structure of the carboxymethylated ethoxylate is tailor-made based on the results of these measurements; its oil-mobilizing efficacy for the respective deposit system can be verified by one or several routine preliminary tests using a sand pile as a model formation or using original drilled cores proper.

The sodium salts among others of the carboxymethylated ethoxylates, produced by reacting the oxethylates with chloroacetic acid in the presence of sodium hydroxide solution, offer several possibilities for performing "molecular architecture" with the goal of setting a desired phase inversion temperature in a specific system:

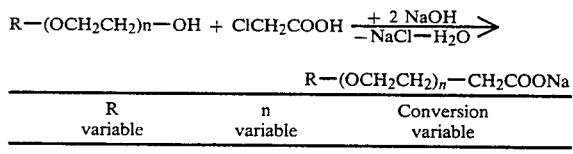

$$R-(OCH_2CH_2)n-OH + ClCH_2COOH \xrightarrow[-NaCl-H_2O]{+ 2 NaOH}$$
$$R-(OCH_2CH_2)_n-CH_2COONa$$

| R | n | Conversion |
|---|---|---|
| variable | variable | variable |

The salts of the carboxymethylated ethoxylates are composed from three variable building blocks: the hydrophobic residue R, the ethoxylate chain, and the carboxymethyl group, the proportion of which in the resultant product mixture can be varied within wide limits by controlling the conversion of the starting ethoxylate with chloroacetic acid.

Suitable starting materials for the hydrophobic residue R include linear and branched (fatty) alcohols, as well as alkyl phenols with any desired alkyl residues. An indication of the influence of the alkyl residue on the phase inversion temperature in a specific system can be garnered from Table 1.

TABLE 1

Dependence of PIT on Length of Alkyl Residue in the Sodium Salts of Carboxymethylated Fatty Alcohol Oxethylates with 4.4 EO and with a Degree of Carboxymethylation of 65%; Crude Oil A (see D. Balzer and K. Kosswig, loc. cit.), Formation Water A (see D. Balzer and K. Kosswig, loc. cit.), Phase Ratio 1:1, 2% Tenside

| C-Number in Alkyl Residue | PIT (°C.) |
|---|---|
| 12 | 74 |
| 13* | 53 |
| 14 | 41 |
| 16 | 37 |

*1:1 Mixture of $C_{12}$ and $C_{14}$

Figure 2:
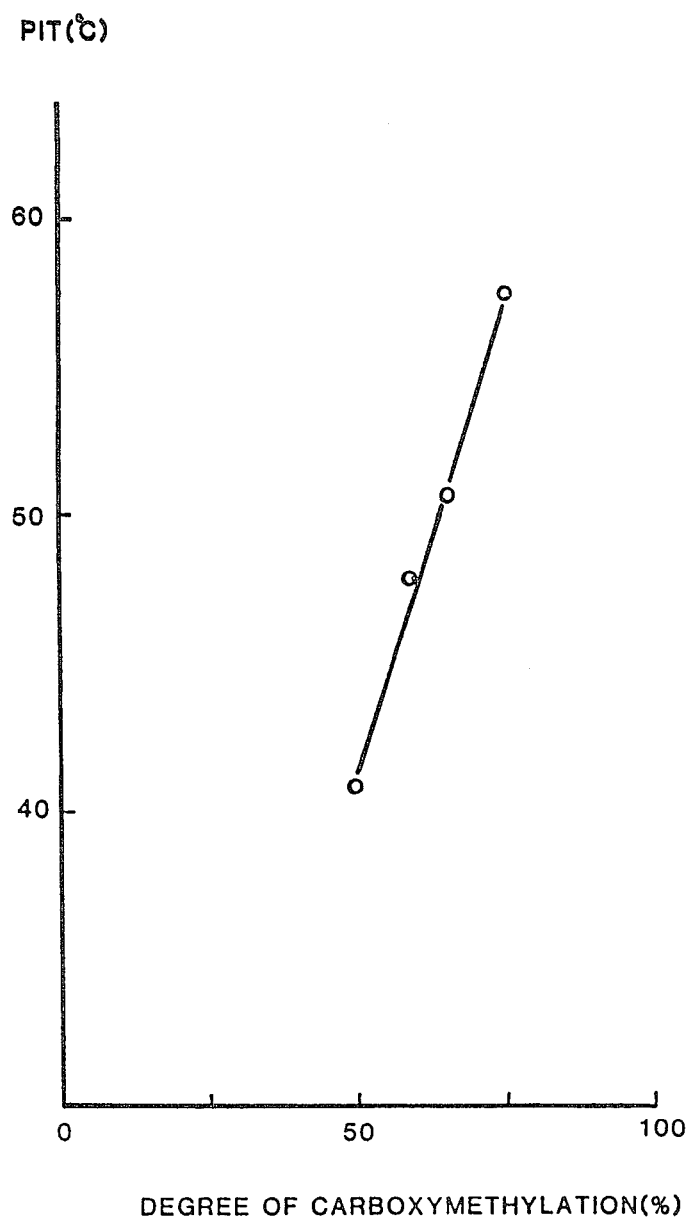

FIGS. 1 and 2 show the dependencies of the phase inversion temperature in a specific system on the degree of oxethylation and on the conversion during carboxymethylation. In both cases, crude oil A and formation water A were used in a phase ratio of 1:1, and 2% tenside. In FIG. 1, the tensides are 70%-carboxymethylated isononylphenol ethoxylates of varying degrees of oxethylation, in FIG. 2 the tensides are isononylphenol ethoxylates with 5.5 EO reacted to various degrees with chloroacetic acid.

Table 1 and FIGS. 1 and 2 demonstrate the variability offered by the class of carboxymethylated ethoxylates, which, in the final analysis, represent mixtures of ionic and nonionic tensides, with respect to the deposit conditions.

Furthermore, if desired, it is also possible to optimize the volume of the tenside solution to be injected, its concentration, the nature of the additives, as well as the type and size of the mobility-controlling polymer solution, using model flooding experiments. Based on the results of these preliminary experiments, the tenside solution is introduced into the reservoir using conventional injection pumps. In this connection, the tenside solution can be used either continuously or in the form of a slug, i.e. a narrowly limited volume of 0.05-4.0 PV (=multiple of pore volume of deposit). The largeness of the slug depends, above all, on the concentration of the tenside solution and conventional economic factors.

The tenside is usually added in the form of a 0.1-20, preferably 1-10% by weight solution or dispersion in formation water. Like all other conditions, amounts and details of the process of this invention, the amount of tenside solution added is such that under the operating conditions of the invention for a given deposit, the PIT requirements of this invention are met. In general, all aspects of the process of this invention are fully conventional unless noted otherwise herein, and are described for example, in Chem. System Report No. 78-5. Process Evaluation—Research Planning, Enhanced Oil Recovery, which is incorporated by reference herein.

Suitably, water flooding will precede the tenside flooding, using as the flooding liquid, the produced formation water. The size of this water slug is usually 0.01-4 PV, preferably 0.05-1.0 PV. Subsequent to the tenside slug, a polymer slug can suitably be conventionally injected into the reservoir for reasons of mobility control as well as for protecting the tenside solution from penetrating formation water. For this purpose, a polymer or polymer mixture is dissolved in the formation water in such a concentration that the viscosity is 4 to 6 times as high as that of the oil. For deposits having medium and higher salinity (3-28 wt %), especially suitable are biopolymers, such as polysaccharides or cellulose derivatives, which still exhibit adequate viscosity in the presence of the increased salt concentration and do not result in precipitations.

In order to more advantageously adapt the viscosity of the tenside solution to the oil of the deposit, or to lessen the tenside and, where applicable, polymer retention, it may be advantageous to add to the tenside slug or to the polymer slug 0.1-30 wt % of alcohols or glycols (i.e., mono-, di- or trifunctional alcohols) as co-surfactants. Suitable co-surfactants in this connection include for example isopropanol, 1-butanol, n-butanol, tert-amyl alcohol, 2-ethylhexanol, butyl diglycol, butyl triglycol, and the like. These additives, of course, must be considered when adapting the tenside to the deposit, i.e., when measuring PIT.

For formation waters relatively poor in alkaline earth metal ions, it may be advantageous to add soluble alkaline earth salts to the tenside solution as well as to the formation water introduced beforehand and afterwards by flooding. When adapting the tenside to the deposit, i.e. when measuring the PIT, these additives must be taken into account.

Normally, the injection of the polymer solution is followed by normal water flooding. This is continued as long as oil can be economically extracted.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Example 1

For the production of an artifical formation, a thermostatable high-pressure pipe having a length of 70 cm and a diameter of 5 cm, equipped with a temperature measuring device and a manometer, bilaterally sealable by threaded closures with capillary inlet and pressure-maintaining valve outlet, is charged with edge-rounded quartz sand. The sand bulk was then saturated with formation water by means of a high-pressure pump, and the desired temperature was set by thermostat. Permeability was measured and thereafter saturation with crude oil was effected, while simultaneously determining the irreducible water content. At this point in time, water flooding was carried out at a flooding rate of about 9 inches/day. After flooding in about 1.5 PV of formation water, reaching a water cut of 98–100%, the tenside was injected as a slug. The polymer solution (0.4 PV) followed as a slug, as well as about 3.0 PV of formation water. Flooding with tenside, polymer, and subsequently with formation water took place at a flooding rate of about 3 inches/day.

The deposit temperature was 47° C., its pressure was 60 bar, the porosity of the artificial formation was about 47%, its permeability was about 1,200 mD, and its irreducible water content was about 25%.

The formation water contained about 20% NaCl, 0.1% KCl, 1.2% $CaCl_2$, and 0.4% $MgCl_2$. The polymer employed was hydroxyethylcellulose (0.25% dissolved in formation water, viscosity at 25° C. about 60 mPa.s). The crude oil was a paraffin-base oil with $n_D^{20}$ 1.486, $d_{20}=0.863$ g/cc and $n_{20}$ 19 mPa.s.

The tenside solution utilized was 0.2 PV of a 6.6% dispersion of carboxymethylated nonylphenol ethoxylate with 5.5 moles of ethylene oxide/mole in formation water. The degree of carboxymethylation was about 70%, the PIT of the respective crude oil emulsion was 48° C.

Water flooding achieved an oil extraction of 75%, which could be raised, after adding another 1.3 PV after the onset of tenside flooding, by 23% to a total oil extraction of 98%. During the transport of the oil bank produced by the tenside, a mean pressure gradient of 0.6 bar/m was measured.

Example 2 (Comparative Example)

Under essentially identical conditions, compounds, and process steps as in Example 1, but at a set deposit temperature of 56° C. (PIT was 48° C. as in Example 1), this comparative example was carried out. By water flooding, an oil extraction of 73% was attained which, after addition of another 1.4 PV after onset of tenside flooding, could be increased to a total oil extraction of 99%. However, a mean pressure gradient of 41 bar/m was measured in this process.

Such a pressure gradient would, if transferred into the field, lead to pressures far above the petrostatic pressure and thus would make use of the tensides in tertiary oil transport impossible.

EXAMPLE 3

This example was conducted under essentially identical conditions, compounds, and process steps as used in Comparative Example 2 (deposit temperature 56° C.), but with a carboxymethylated nonylphenol ethoxylate with 5.9 moles of ethylene oxide/mole. The PIT was 58° C. The degree of oil extraction after water flooding was 75% and could be raised by subsequent tenside flooding to 99%. The mean pressure gradient had a value of 0.7 bar/m.

Example 4 (Comparative Example)

Under practically identical conditions, compounds, and process steps as in Example 1, this example was conducted, but with a 0.4 PV tenside slug of carboxymethylated fatty alcohol ($C_{12}$–$C_{14}$)-ethoxylate with 4.5 moles of ethylene oxide/mole in 5.5% strength dispersed in formation water (PIT 53° C.) and with a deposit temperature of 56° C. By water flooding, an oil extraction of 77% was accomplished. This could be raised after adding another 1.4 PV by tenside flooding to 99%. The mean pressure gradient rose to 23 bar/m.

Example 5

This example was carried out under the conditions, process steps and compounds used in Comparative Example 4 (PIT 53° C.). The deposit temperature, however, was set at a value of 49° C. in this example. The oil extraction by water flooding was 76%, which by the subsequent tenside flooding rose by another 22%. As compared with Comparative Example 4, a mean pressure gradient of only 0.7 bar/m was measured in this example.

Example 6 (Comparative Example)

This example was conducted under essentially identical conditions, process steps and compounds as set forth in Example 3, but at a deposit temperature of 44° C. (PIT 58° C., i.e. 14° above deposit temperature). The degree of oil extraction after water flooding was 77%. This amount could be raised to 94% by addition of more tenside, in which addition, initially 10% of the tertiary oil was transported emulsion-free and then another 7% in the form of an O/W emulsion. The mean pressure gradient during transportation of the oil bank here was 0.6 bar/m.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recovering extensively emulsion-free crude oil from a subterranean deposit of medium or high salinity, comprising injecting into an injection well therein, a tenside solution or dispersion in formation water comprising 0.1-20 wt% of a mixture of 0-90 wt % of ethoxylates of the formula:

$$R-(OCH_2CH_2)_nOH$$

and 100-10 wt % of carboxymethylated ethoxylates of the formula:

$$R-(OCH_2CH_2)_n-OCH_2-COOM$$

wherein
- R is a hydrocarbon aliphatic group of 4-20 carbon atoms or a mono- or dialkylphenyl group of 1-14 carbon atoms in the alkyl group,
- n is 1-30, and
- M is an alkali or alkaline earth metal ion or ammonium,
- wherein the tenside is selected so that the phase inversion temperature and recovering said extensively emulsion-free crude oil from said deposit of the system: crude oil/formation water/tenside, lies 0°-10° C. above the deposit temperature.

2. A process of claim 1, wherein the tenside solution or dispersion further comprises a mono-, di-, or trihydric alcohol.

3. A process of claim 1, wherein the phase inversion temperature of the system: crude oil/formation water/tenside, lies 1°-5° C. above the deposit temperature.

4. A process of claim 1 wherein water soluble alkaline earth metal salts are added into the formation water.

5. A process of claim 1 wherein, prior to injecting the tenside solution or dispersion, 0.01-4 PV of formation water is injected into the deposit.

6. A process of claim 1 wherein, after injection of the tenside solution or dispersion, 0.01-4 PV of formation water is forced into the deposit.

7. A process of claim 6, wherein said formation water forced into said deposit contains a viscosity-raising polymer.

8. A process of claim 1 wherein the tenside mixture contains 30% to 90 wt % of carboxymethylated ethoxylates.

9. A process of claim 1 wherein the tenside mixture contains 50% to 85 wt % of carboxymethylated ethoxylates.

10. A process of claim 1 wherein the tenside mixture contains 10% to 90 wt % of carboxymethylated ethoxylates.

11. A process of claim 1 wherein the tenside mixture contains 50% to 100 wt % of of carboxymethylated ethoxylates.

12. A process of claim 1, wherein the phase inversion temperature lies 1°-10° C. above the deposit temperature.

* * * * *